United States Patent [19]

Konii

[11] Patent Number: 4,756,174
[45] Date of Patent: Jul. 12, 1988

[54] AUTOMOTIVE VEHICLE USE STEERING SHAFT LOCKING AND UNLOCKING ARRANGEMENT

[75] Inventor: Katsuji Konii, Tokyo, Japan

[73] Assignee: Kokusan Kinzoku Kogyo Kabushiki Kaisha, Tokyo, Japan

[21] Appl. No.: 40,805

[22] Filed: Apr. 21, 1987

[51] Int. Cl.$^4$ .............................................. B60R 25/02
[52] U.S. Cl. ........................................ 70/185; 70/252
[58] Field of Search ................ 70/182, 183, 184, 185, 70/186, 187, 252, 247, 248; 180/271, 287; 74/478, 475, 538, 483 R

[56] References Cited

U.S. PATENT DOCUMENTS

| | | | |
|---|---|---|---|
| 3,859,828 | 1/1975 | Ibuka | 70/252 |
| 3,917,021 | 11/1975 | Williams | 70/252 |
| 4,232,538 | 11/1980 | Detloff | 70/252 |
| 4,232,571 | 11/1980 | Kimbertin | 70/252 |
| 4,270,624 | 6/1981 | Jessop | 70/252 |
| 4,433,562 | 2/1984 | Tsuchiya | 70/186 |

Primary Examiner—Robert L. Wolfe
Attorney, Agent, or Firm—Fleit, Jacobson, Cohn & Price

[57] ABSTRACT

In a steering shaft locking and unlocking arrangement including a key-operated cylinder lock unit, the rotor of which is mechanically coupled with a cam for control of a spring-biased locking and unlocking bolt, a checker is fixedly mounted on the rotor. A combined hook-and-lever unit is provided for cooperation with the checker, so as to prevent unintentional steering shaft locking while the vehicle is running. For this purpose, the combined unit is mechanically coupled with a vehicle speed control lever through cable means, so as to prevent the cylinder lock rotor from turning to the locking position.

5 Claims, 4 Drawing Sheets

ACC-POSITION

PARKING-POSITION

LOCK-POSITION

FIG. 5
FIG. 6
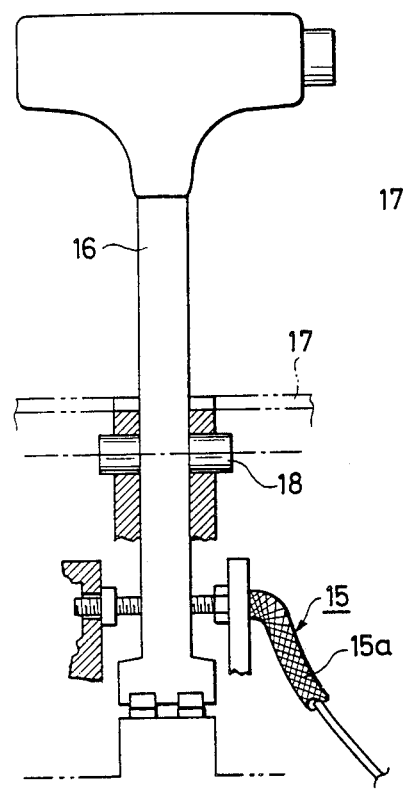
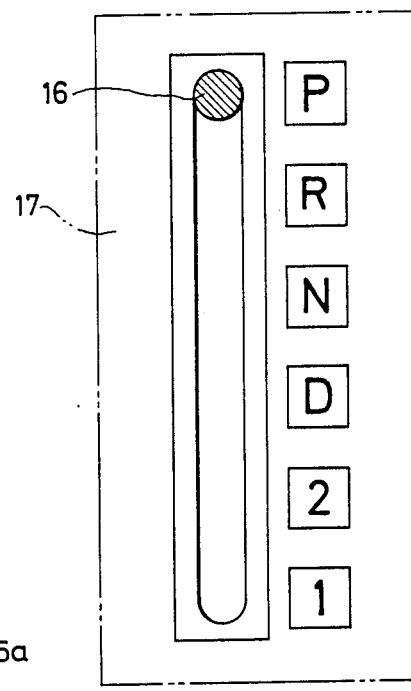

AUTOMOTIVE VEHICLE USE STEERING SHAFT LOCKING AND UNLOCKING ARRANGEMENT

BACKGROUND OF THE INVENTION

1. Field of the Invention

The present invention relates to improvements in and relating to automotive steering locks wherein engine ignition control switch assembly is combined with a cylinder lock.

2. Prior Art

In the representative prior art steering lock arrangement, the engine ignition control switch assembly is so designed and arranged that by manual rotation of the rotor of the cylinder lock upon insertion of a mechanical key in position thereinto, the switch assembly is shifted in its operational position from "LOCK" through "ACC" and "ON" to "START" position. At the same time, in this case, a locking and unlocking bolt, briefly called "locking bolt", is caused to disengage from the steering shaft of the automotive vehicle by the corresponding rotary motion of a cam fitted coaxially with the cylinder rotor. Reversingly, when the cylinder rotor controlling the ignition switch unit is rotated in the reverse direction by manual operation of the key, back to the LOCKING-position and then the key is drawn off from the cylinder lock, the locking bolt is advanced to the locking position under the action of the actuating spring.

In order to prevent a careless or accidental draw-off of the key from the cylinder lock during running stage of the vehicle, it is commonly employed to execute an additional safe guarding manual operation is applied directly before the LOCKING-position. Such conventional steering lock assembly is called "two step-operation type".

SUMMARY OF THE INVENTION

It is, therefore, an object of the present invention to provide an improved steering lock and unlock arrangement for assuring fail-proof operation to prevent accidental or careless invitation of steering lock position during running period of the automotive vehicle.

A further object is to provide an improved steering lock and unlock arrangement of the above kind, further capable of being devoid of additional and intentional manual operation of certain safely means during play-back operational period.

Still a further object of the present invention is to provide an improved steering lock and unlock arrangement for positive prevention of accidental and unintentional withdrawal of the mechanical key, while the vehicle is running.

For attaining these objects, the inventive steering lock and unlock arrangement comprises a combined hoo-and-lever unit is pivotably mounted on the housing of a key-operable cylinder lock unit, the lever portion of said combined unit being connected through a reciprocatingly operable link means with a conventional vehicle speed control lever, briefly called "shift lever", in such a way that the hook portion of said combined unit is brought into engagement with a checker fixedly mounted on the rotor of the cylinder lock unit directly in advance of LOCK-position, preferably at ACC-position of the latter for preventing any rotary movement of the cylinder lock rotor. With the shift lever brought into and kept at the PARKING-position, however, the hook portion of said combined lever being freed from engagement with the checker, so as to hold the cylinder lock rotor in the rotatable position.

These and further objects, features and advantages of the invention will become more apparent as the description proceeds with reference to the accompanying drawings, illustrating a preferred embodiment of the invention.

BRIEF DESCRIPTION OF THE DRAWINGS

FIG. 5 is a schematic elevational view of the shift lever unit employed therein.

FIG. 6 is a schematic plan view of the guide slot for the shift lever which is shown, however, in cross-section.

PREFERRED EMBODIMENT OF THE INVENTION

Referring now to the accompanying drawings, substantially a preferred embodiment of the invention will be described more in detail.

Figure 1:
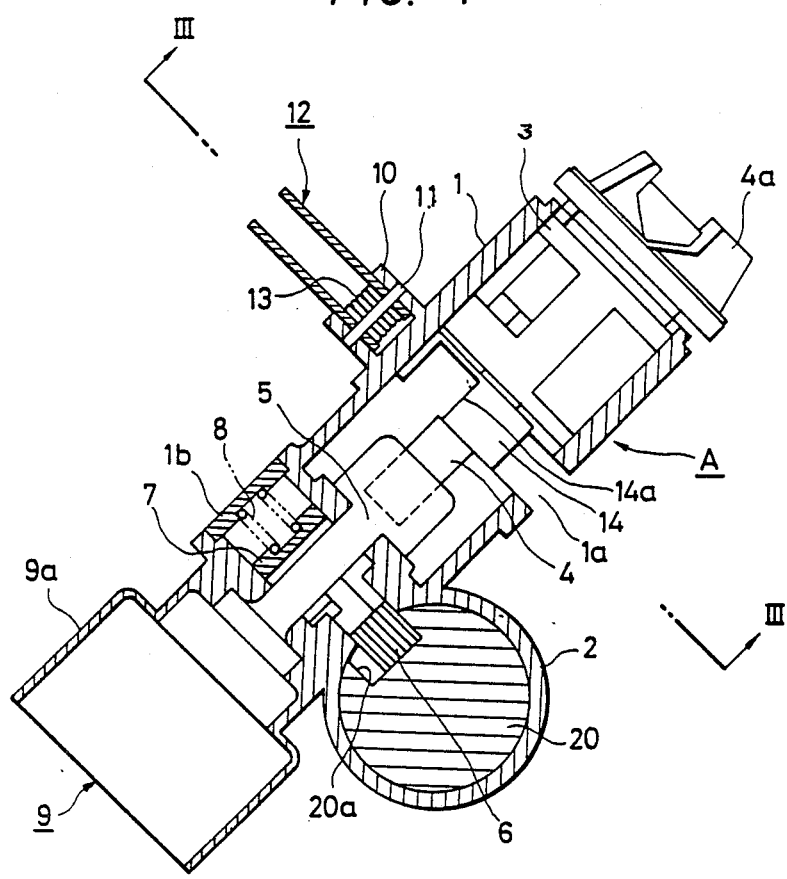
FIG. 1 is a longitudinal section of the steering lock assembly according to the present invention.
Figure 2:
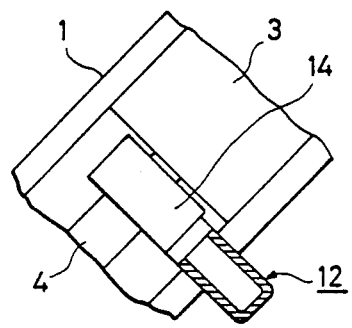
FIG. 2 is a partially sectioned plan view of a part of the steering lock assembly shown in FIG. 1, for specifically illustrating the mutual positional relationship between the checker and the combined hook-and-lever means.

In FIG. 1, numeral 1 represents a housing of the steering lock assembly "A" of an automotive vehicle, not shown, said housing being rigidly connected or united with a conventional stationary steering column 2. A conventional cylinder lock unit 3 having a rotatable rotor or barrel 4 is mounted in the housing 1. Numeral 4a represents a manually rotatable knob which is rigidly attached to the front end of the rotor 4. At the rear end of the rotor 4, elongated cam means 5 extending axially of the lock assembly are rigidly attached. A conventional locking bolt 6 is mounted movably to-and-fro in the lateral direction relative to the axis of the cam means and mechanically linked with or kept in pressure engagement wth a hanger 7 so as to move in unison, the latter being urged by a coil spring 8 which is arranged between a cap 1b attached to the housing 1 and the hanger 7, urging normally hanger 7 and bolt 6 in the shaft-locking direction. In FIG. 1, locking bolt 6 is shown in its steering shaft-locking position, wherein the bolt is kept in locking engagement with a reception recess 20a of steering shaft 20, which is rotatably mounted within the hollow space of the steering column 2. As is commonly known, the shaft 20 is mounted with least possible idle gap on the inside wall surface, although such gap has been omitted from the drawing.

When the mechanical key k (FIG. 4) is inserted through a key insertion opening 4b (FIG. 4) formed at the front end of the rotor 4 into conventional key way provided in the latter, although not appearing in the drawing, and turned the rotor clockwise so as to turn it in the same rotational direction, then, the cam 5 is rotated naturally in unison therewith, thereby hanger 7 and rod 6 being receded from the locking position shown in FIG. 1 and against the action of pressure spring 8 towards the unlocking position, not shown. In this manual rotation, the provision of knob 4a will provide substantial ease in the operation. Although not shown, there is provided a check lever in the inside space of housing 1 which lever is sensible to key insertion and drawout and executes a small angle pivotal movement. With full insertion of the key into position, the check lever will hold the hanger and bolt a its receded unlocking position. However, when the key has been drawn out from position, the check lever will perform a reversed pivotal movement, thereby the hanger and bolt being released from the unlockingly held position and forcibly advanced under the action of spring 8 towards the locking position shown in FIG. 1.

Additionally, cam 5 is mechanically coupled at its rear end with an electric switch unit 9 for control of the driving internal combustion engine, not shown, of the vehicle. Naturally with the rotational movement of rotor-and-cam unit, the switch unit 9 is subjected to control, as conventionally. It should be noted that the switch unit 9 is shown by its casing 9a only, on account of its very popularity. The casing 9 is made preferably rigid with the cylinder lock housing 1.

From housing 1, a pair of projecting arms 10 extend laterally and outwardly as shown, a mechanical control member 12, preferably a hook-and-lever combination as shown, being pivotably mounted on a pivot pin 11 which is firmly bridged between the arms 10 and mounted thereby in position. The hook portion is shown with 12a, while the lever portion is illustrated with 12b, as most clearly be seen in FIG. 3. Around the pin 11, an urging coil spring 13 is mounted, for urging the hook portion 12a of control member 12 towards contact with outer surface of a rotation checker 14 formed on the rotor 4 through an opening 1a of the housing 1.

Figure 3A:
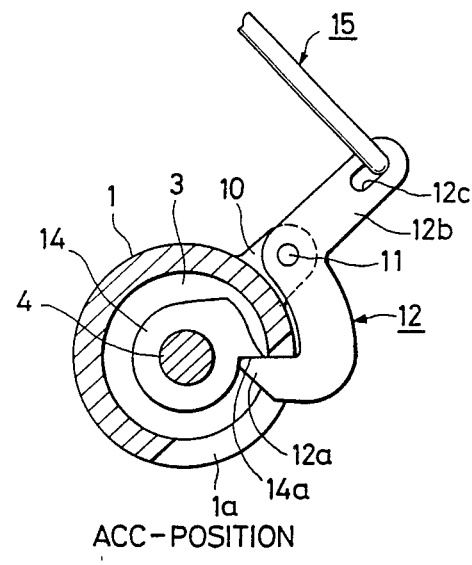
FIG. 3, at (A), (B) and (C), illustrates in cross-section three different mutual operational positions between the checker and the combined hook-and-lever means.
Figure 3B:
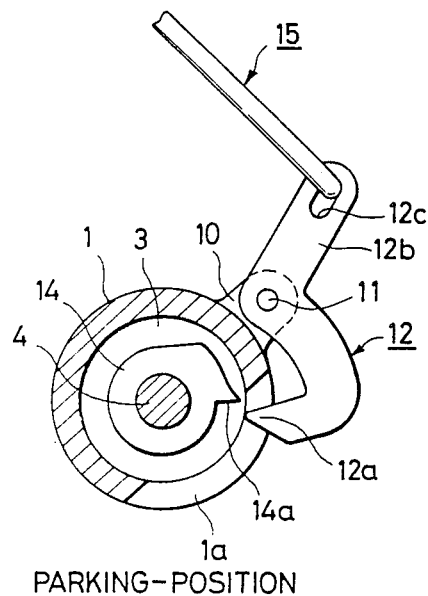
Figure 3C:
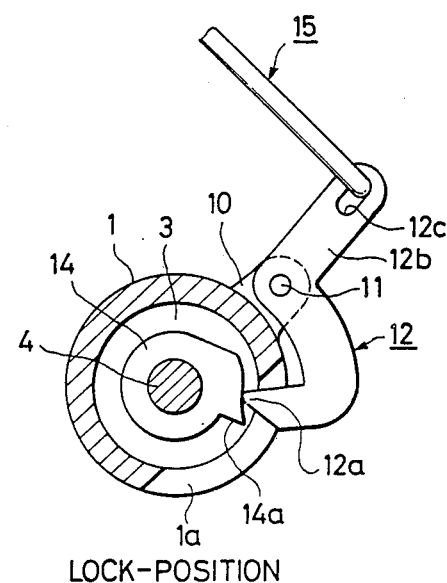

An abrupt shoulder 14a is formed on the outer periphery of checker 14, as shown in FIG. 3.

Figure 4:
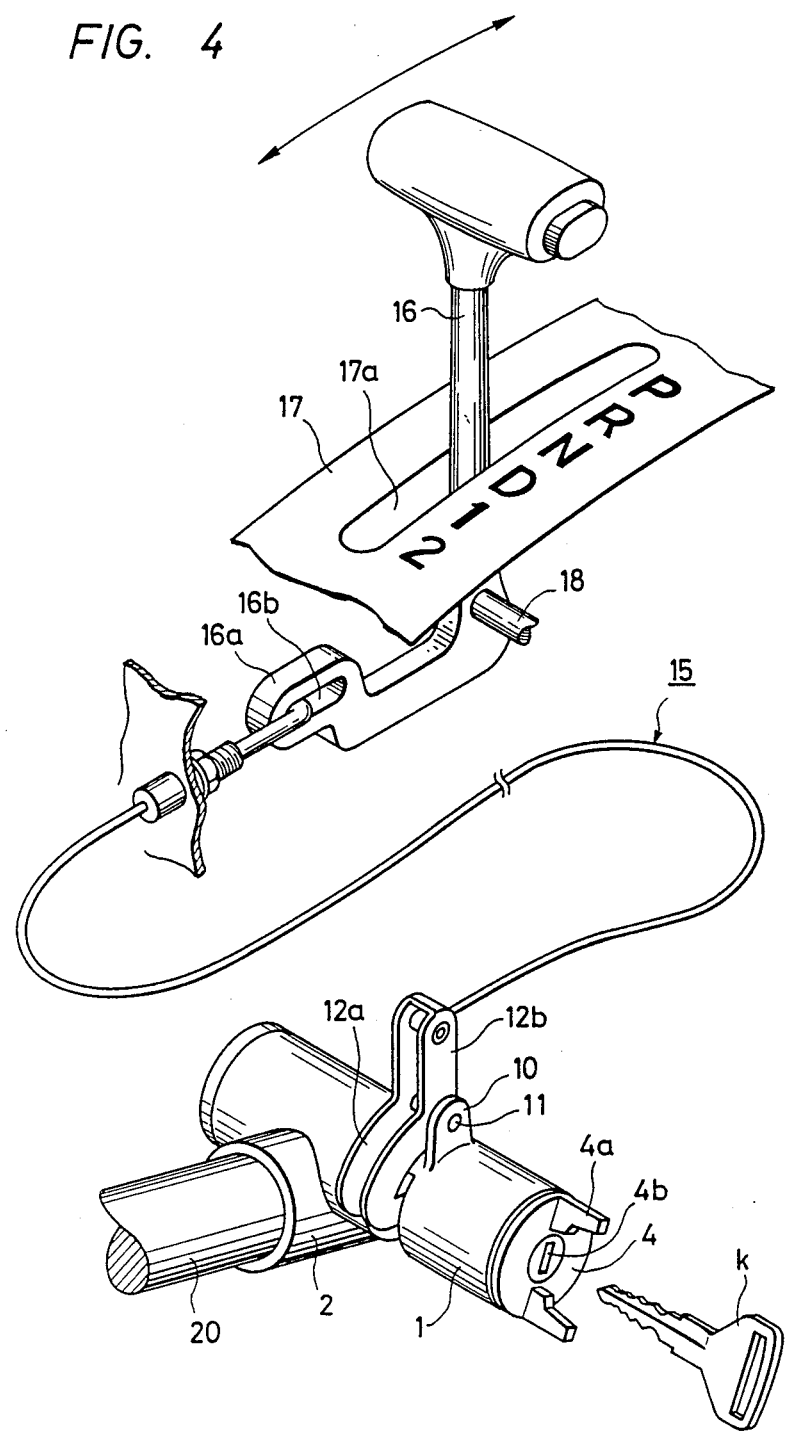
FIG. 4 is a schematic perspective view of the inventive steering lock and unlock arrangement as a whole.

The tip end of lever 12b is mechanically connected through a sheathed wire 15 leading to conventional shift lever 16, FIG. 4. The sheath shown at 15a in FIG. 4, is held substantially stationary.

With rotor 4 and ignition switch unit 9 positioned at the LOCKING-position, the mechanical control member 12 is positioned as shown in FIG. 3 at (C), relative to the rotation checker 14. Then, the driver personnel operates the key k to turn the rotor 4 in the counter clockwise therefrom through ACC- and ON- to START- position for correspondingly switching the ignition switch unit 9, together with rotor 4, for starting the engine.

By a reverse turning of the rotor 4 by corresponding manipulation of key k, the hook-portion 12a of control member 12 is brought at ACC-position shown in FIG. 3 at (A) into engagement with the shoulder 14a on rotation checker 14, thus any further rotation of the rotor being positively prevented. Under this condition, however, when the vehicle is stopped and the shift lever 16 is transferred to PARKING-position, motion will be transmitted therefrom through motion-transmitter 15, preferably sheathed wire cable, reversible mechanical linkage, to control member 12, the hook portion 12a thereof being thereby disengaged from the shoulder 14a of checker 14 and the rotor 4 and switch unit 9 being capable to turn towards the LOCK-position. Under this operating position where the vehicle is at dead stop, the driver will draw the mechanical key out of the key cylinder, motion being thereby transmitted from the shift lever through the intermediary of wire cable proper 15b of the sheathed cable 15 to the lever portion 12b of combined lever-and-hook 12, for disengaging the hook portion 12a from rotation checker 14, as specifically shown at (B) of FIG. 3. By this operation, the rotor 4 is released from the bound state and becomes freely rotatable, resulting into an advancement of the shaft-locking bolt 6 towards the steering shaft lock position under the action of the urging spring 8 shown in FIG. 1.

This operational relationship between the shift lever 16 and the lever portion 12b of combined member 12 will become more fully clear from the following disclosure taken with reference to FIGS. 4, 5 and 6 in combination.

Shift lever 16 is pivotable by being guided along a guide slot 17a formed through a stationary guide 17 and about a stationary pivot 18 rigidly supported on a part of the vehicle chassis, not shown. Along the periphery of the guide slot 17a. there are several reference characters P, R, N, 2 and 1, representing "PARKING", "REAR", "NEUTRAL", "DRIVE", "SECOND" and "FIRST", as commonly known to those skilled in the art. Shift lever 16 is illustlated in FIG. 5, hold at the PARKING-position.

With pivotal movement of shift lever 16, the lower and crooked lever end 16a slotted at 16b will execute a corresponding pivotal motion in a to-and-fro-mode. The correspondent of core wire cable 15b is kept in engagement with the slot 16b for motion-transmittable manner. Therefore, a pulling motion will be transmitted from the lever end 16a when the shift lever 16 is moved from "NEUTRAL", as an example, to "PARKING", as was referred to hereinbefore, for releasing the hook portion 12a from engagement with the checker shoulder 12a, and vice versa.

It should be noted that the cable sheath 15a and core cable 15b have been shown as if these are flexible only for clearer and schematic illustration purpose only. In fact, the sheath 15a is held substantially in a stationary and non-flexible manner, so as to allow the core cable 15b a to-and-fro motion-transmittable movement, as will be easily understood from the foregoing description.

What is claimed is:

1. Steering shaft locking and unlocking arrangement for an automotive vehicle, comprising:
    a cylinder lock comprising a stationary housing;
    a rotatable rotor mounted in said housing;
    a rotation checker on said rotor and rotatable in unison therewith;
    a pivotable member mounted on said stationary housing;
    a shift lever for speed control of said vehicle; and
    mechanical linkage means arranged between said shift lever and said pivotable member for freeing cooperative engagement between said pivotable member and said rotation checker when said shift lever is shifted to PARKING-position, so as to keep the cylinder lock rotor rotatable to LOCK-position by keying operation of the cylinder lock.

2. The arrangement of claim 1, wherein said pivotable member is a combined lever-and-hook member, the lever portion thereof being connected through said mechanical linkage with said shift lever.

3. The arrangement of claim 2, wherein said rotation checker is formed with an abrupt shoulder for engagement with the hook portion of said pivotable member.

4. The arrangement of claim 1, wherein said mechanical linkage is a sheathed wire cable, the sheath portion thereof being substantially held stationary.

5. The arrangement of claim 2, wherein the lever is exposed out of the interior of said cylinder lock housing.

* * * * *